ns864B2

(12) United States Patent
Motoyoshi (10) Patent No.: US 10,022,864 B2
(45) Date of Patent: Jul. 17, 2018

(54) ROBOT CONTROL APPARATUS, ROBOT SYSTEM, AND ROBOT CONTROL METHOD

(71) Applicant: Seiko Epson Corporation, Tokyo (JP)

(72) Inventor: Masaki Motoyoshi, Azumino (JP)

(73) Assignee: Seiko Epson Corporation (JP)

( * ) Notice: Subject to any disclaimer, the term of this patent is extended or adjusted under 35 U.S.C. 154(b) by 169 days.

(21) Appl. No.: 15/072,663

(22) Filed: Mar. 17, 2016

(65) Prior Publication Data
US 2016/0288327 A1    Oct. 6, 2016

(30) Foreign Application Priority Data

Mar. 31, 2015   (JP) ................. 2015-071195

(51) Int. Cl.
| | |
|---|---|
| B25J 9/16 | (2006.01) |
| G05B 19/39 | (2006.01) |
| B25J 13/08 | (2006.01) |
| G05B 19/23 | (2006.01) |
| G05B 19/29 | (2006.01) |
| G05B 19/40 | (2006.01) |

(Continued)

(52) U.S. Cl.
CPC .......... *B25J 9/1633* (2013.01); *B25J 9/1653* (2013.01); *B25J 13/085* (2013.01); *G05B 19/231* (2013.01); *G05B 19/251* (2013.01); *G05B 19/291* (2013.01); *G05B 19/311* (2013.01); *G05B 19/39* (2013.01); *G05B 19/40* (2013.01); *G05B 2219/39318* (2013.01); *G05B 2219/39321* (2013.01); *G05B 2219/39322* (2013.01); *G05B 2219/39329* (2013.01); *G05B 2219/39332* (2013.01); *G05B 2219/39343* (2013.01); *G05B 2219/41021* (2013.01)

(58) Field of Classification Search
CPC ...... B25J 9/1633; B25J 9/1653; B25J 13/085; G05B 19/39; G05B 19/40; G05B 19/231; G05B 19/251; G05B 19/291; G05B 19/311; G05B 2219/39321; G05B 2219/39318; G05B 2219/39322; G05B 2219/39332; G05B 2219/39343; G05B 2219/39329; G05B 2219/41021
USPC ................ 700/245, 250, 253, 258, 260, 261
See application file for complete search history.

(56) References Cited

U.S. PATENT DOCUMENTS

| | | | |
|---|---|---|---|
| 6,140,788 A | 10/2000 | Watanabe et al. | |
| 7,206,626 B2 * | 4/2007 | Quaid, III | A61B 90/36 600/407 |

(Continued)

FOREIGN PATENT DOCUMENTS

| | | |
|---|---|---|
| JP | 62-035915 A | 2/1987 |
| JP | 06-170763 A | 6/1994 |

(Continued)

*Primary Examiner* — Leslie A Nicholson, III
(74) *Attorney, Agent, or Firm* — Harness, Dickey & Pierce, P.L.C.

(57) ABSTRACT

In order to stabilize control of a driving section, a robot control apparatus includes a control section that acquires a driving position of the driving section that drives a robot and an operation force that is a force operating on the robot, and performs first control of the driving section based on the driving position and second control of the driving section based on the operation force; and a changing section that changes a size of servo stiffness of the robot that is realized by the control of the control section.

11 Claims, 4 Drawing Sheets

GUI

SERVO STIFFNESS SETTING

JOINT IN WHICH SERVO STIFFNESS IS REDUCED —— CH
WHEN PARALLEL CONTROL IS PERFORMED

☐ J1   ☐ J2   ☑ J3   ☑ J4   ☑ J5   ☐ J6

DETERMINATION —— B (51) Int. Cl.
    *G05B 19/31*     (2006.01)
    *G05B 19/25*     (2006.01)

(56) References Cited

U.S. PATENT DOCUMENTS

| | | | |
|---|---|---|---|
| 7,508,155 B2 * | 3/2009 | Sato | B25J 9/1633 |
| | | | 318/437 |
| 7,880,717 B2 * | 2/2011 | Berkley | G06F 3/016 |
| | | | 318/560 |
| 8,170,719 B2 * | 5/2012 | Tsusaka | B25J 9/1633 |
| | | | 700/257 |
| 8,423,188 B2 * | 4/2013 | Tsusaka | B25J 9/0003 |
| | | | 700/250 |
| 8,483,879 B2 * | 7/2013 | Gao | B25J 9/1633 |
| | | | 318/567 |
| 9,339,934 B2 * | 5/2016 | Kogan | B25J 9/1656 |
| 9,346,164 B1 * | 5/2016 | Edsinger | B25J 9/1694 |
| 2007/0210740 A1 | 9/2007 | Sato et al. | |

FOREIGN PATENT DOCUMENTS

| | | |
|---|---|---|
| JP | 06-250728 A | 9/1994 |
| JP | 10-207519 A | 8/1998 |
| JP | 10-230493 A | 9/1998 |
| JP | 10-264063 A | 10/1998 |
| JP | 2007-105823 A | 4/2007 |
| JP | 2007-237312 A | 9/2007 |
| JP | 2013-111684 A | 6/2013 |

* cited by examiner

ROBOT CONTROL APPARATUS, ROBOT SYSTEM, AND ROBOT CONTROL METHOD

BACKGROUND

1. Technical Field

The present invention relates to a robot control apparatus, a robot system, and a robot control method.

2. Related Art

A technique, which performs position control such that a workpiece moves along an operation path and performs force control such that a pressing force of a tool with respect to the workpiece detected by a force sensor becomes a set value, is known (see JP-A-6-170763).

However, when performing the force control based on the position control or a velocity control, a driving section such as a motor is hypersensitively controlled by a state of a tool, and there is a problem that the state of the tool becomes unstable. For example, there is a problem that the control is performed, thereby causing oscillation of a position of the tool.

SUMMARY

An advantage of some aspects of the invention is to provide a technique in which control of a driving section can be stabilized.

A robot control apparatus according to an aspect of the invention includes a control section that acquires a driving position of a robot that is driven by a driving section and an operation force that is a force operating on the robot, and performs first control of the driving section based on the driving position of the robot and second control of the driving section based on the operation force; and a changing section that changes a size of servo stiffness of the robot that is realized by the control of the control section.

In the above-described configuration, it is possible to change the size of the servo stiffness of the robot that is realized by the control of the control section in performing the first control of the driving section based on the driving position of the robot and the second control of the driving section based on the operation force. When combining the first control and the second control, it is possible to suppress that the driving section is hypersensitively controlled and to stabilize the control of the control section by changing the size of the servo stiffness.

Function of respective units described in the appended claims can be implemented by hardware resources whose functions are specified by configuration itself, hardware resources whose functions are specified by programs, or a combination thereof. In addition, the functions of the respective units are not limited to each of those which is implemented by hardware resources that are physically independent.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings in accordance with the following sequence. Moreover, the same reference numerals are given to the corresponding configuration elements in each view and redundant description will be omitted.

(1) First Embodiment
(2) Other Embodiments

(1) First Embodiment

Figure 1:
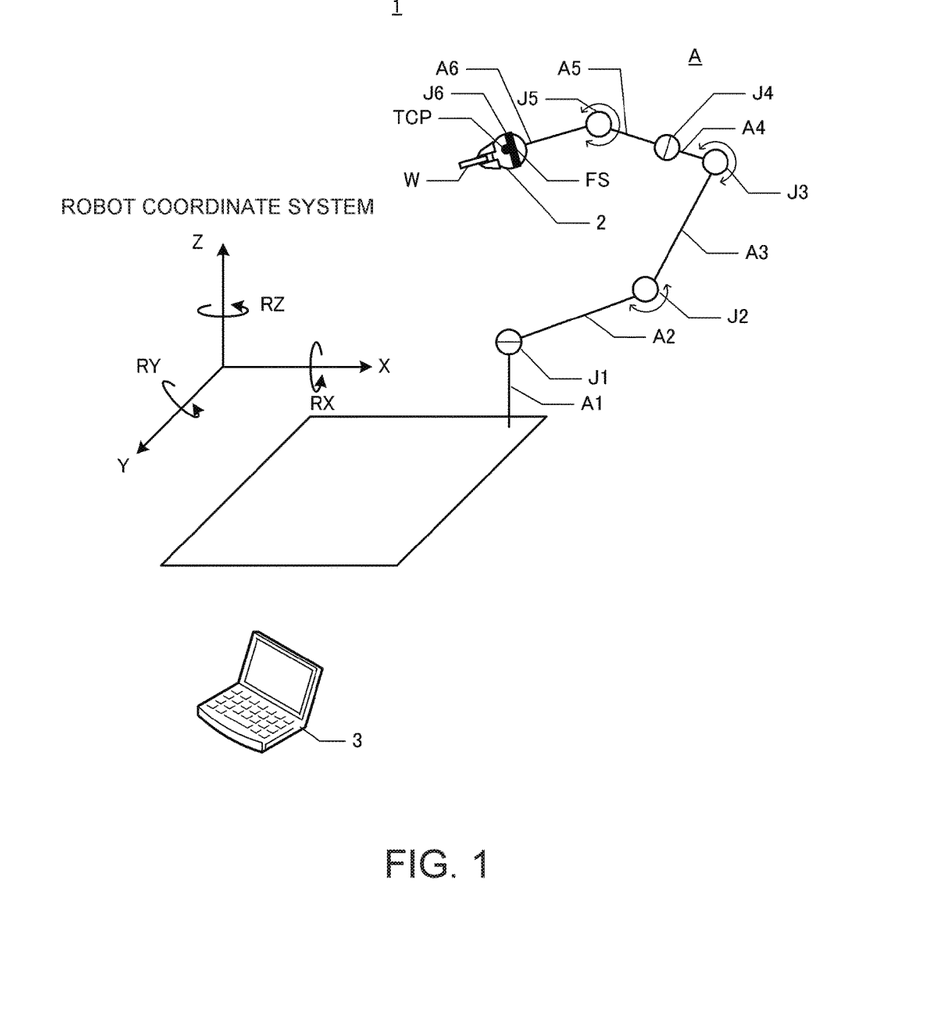
FIG. 1 is a schematic diagram of a robot system.

As illustrated in FIG. 1, a robot system as a first embodiment of the invention includes a robot 1, an end effector 2, and a control terminal 3 (controller). The control terminal 3 configures a robot control apparatus according to the invention. The control terminal 3 may be a dedicated computer or may be a general-purpose computer in which programs for the robot 1 are installed.

The robot 1 is a single-arm robot including one arm A and the arm A includes six joints J1, J2, J3, J4, J5, and J6. Six arm members A1 to A6 are connected by the joints J1, J2, J3, J4, J5, and J6. The joints J2, J3, and J5 are bending joints and the joints J1, J4, and J6 are torsion joints. The end effector 2 for performing gripping, processing, and the like for a workpiece is mounted on the joint J6. A predetermined position on a rotational shaft of the joint J6 represents a tool center point (TCP). The position of the TCP is a reference of positions of various end effectors 2. In addition, a force sensor FS is included in the joint J6. The force sensor FS detects a size of a force on three detection axes orthogonal to each other and detects a size of torque around three detection axes.

In FIG. 1, the end effector 2 gripping a workpiece W is mounted on the front end of the joint J6. A coordinate system defining a space in which the robot 1 is installed represents a robot coordinate system. The robot coordinate system is a three-dimensional orthogonal coordinate system defined by an X-axis and a Y-axis orthogonal to each other on a horizontal plane, and a Z-axis of which a positive direction extends vertically upward. In addition, a rotation angle around the X-axis is represented by RX, a rotation angle around the Y-axis is represented by RY, and a rotation angle around the Z-axis is represented by RZ. It is possible to represent an arbitrary position in a three-dimensional space by a position in X, Y, and Z directions and to represent an arbitrary posture (rotating direction) in the three-dimensional space by the rotation angles in RX, RY, and RZ directions. Hereinafter, if the position is referred, the posture may also be meant. In addition, if the force is referred, the torque operating in the RX, RY, and RZ directions may also be meant. The control terminal 3 controls the position of the TCP in the robot coordinate system by driving the arm A.

Figure 2:
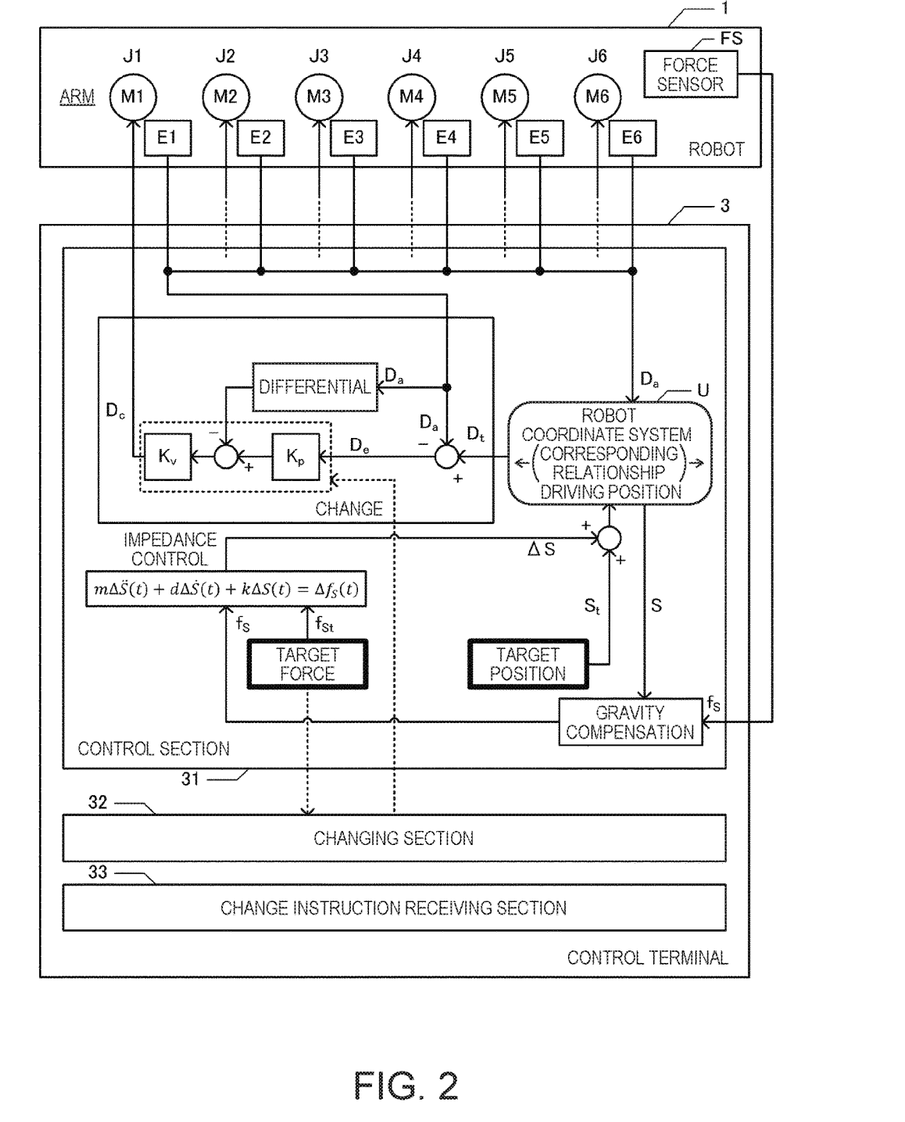
FIG. 2 is a block diagram of the robot system.

FIG. 2 is a block diagram of a robot system. A control program for performing control of the robot 1 is installed in the control terminal 3. The control terminal 3 includes a processor, a RAM, and a ROM, and these hardware resources cooperate with the control program. Thus, as illustrated in FIG. 2, the control terminal 3 includes a control section 31, a changing section 32, and a change instruction receiving section 33. Although not illustrated, the control terminal 3 includes input devices (mouse, keyboard, touch panel, and the like) receiving instructions from the user and output device (display, speaker, and the like) outputting various pieces of information to the user.

The control section 31 controls the arm A of which a target position and a target force set, for example, by teaching by a user are realized by the TCP. The target force is a force to be detected by a force sensor FS. S represents any one direction among axis directions (X, Y, Z, RX, RY, and RZ)

defining the robot coordinate system. For example, if S=X, an X-direct ion component of the target position set in the robot coordinate system is denoted as $S_t=X_t$ and the X-direction component of the target force is denoted as $f_{St}=f_{Xt}$. In addition, S also represents a position in an S-direction.

The robot 1 includes motors M1 to M6 as driving sections and encoders E1 to E6 in addition to the configuration illustrated in FIG. 1. The motors M1 to M6 and the encoders E1 to E6 are included respectively corresponding to the joints J1 to J6, and the encoders E1 to E6 detect the driving positions of the motors M1 to M6. Controlling the arm A means controlling the motors M1 to M6. The control section 31 is able to communicate with the robot 1. The control section 31 stores a corresponding relationship U between a combination of the driving positions of the motors M1 to M6 and the position of the TCP in the robot coordinate system. In addition, the control section 31 stores the target position $S_t$ and the target force $f_{St}$ for each operation process performed by the robot 1.

Both the target position $S_t$ and the target force $f_{St}$ are stored in a certain step and only the target position $S_t$ is stored in another step. For example, in a step of fitting the workpiece W into a fitting hole in a fitting operation, both the target position $S_t$ that is the position of the TCP when the workpiece W is fitted into the deepest portion of the fitting hole and the target force $f_{St}$ that corresponds to a force that can reliably fit the workpiece W to the deepest portion of the fitting hole are set. On the other hand, in a step in which the workpiece W is simply moved to a desired position in a space in the fitting operation, the target position $S_t$, which is the position of the TCP when workpiece is positioned in a desired position, is set and the target force $f_{St}$ is not set. Transition conditions of each step are variously considered. In the transition conditions, for example, the TCP may also approach a value that is equal to or greater than a predetermined reference with respect to the target position $S_t$, a force approaching a value that is equal to or greater than a predetermined reference with respect to the target force $f_{St}$ may be detected by the force sensor FS, or a predetermined period may be elapsed from starting of a step.

The control section 31 converts the driving positions $D_a$ into positions S of the TCP in the robot coordinate system (X, Y, Z, RX, RY, and RZ) based on the corresponding relationship U when acquiring the driving positions $D_a$ of the motors M1 to M6. The control section 31 specifies an operation force f operating on the force sensor FS in reality in the robot coordinate system, based on the position S of the TCP and a detection value of the force sensor FS. Moreover, the force sensor FS detects a detection value in its own coordinate system and since a relative position and direction between the force sensor FS and the TCP are stored as known data, the control section 31 can specify the operation force f in the robot coordinate system. The control section 31 performs gravity compensation with respect to the operation force f. The gravity compensation is performed to remove the gravity component from the operation force f. In addition, the operation force f in which the gravity component is performed can be regarded as a force other than the gravity operating on the workpiece.

In a step in which both the target position $S_t$ and the target force $f_{St}$ are set, the control section 31 specifies a resultant force correction amount ΔS that is obtained by substituting the target position $S_t$ and the operation force f in a motion equation of the impedance control. Expression (1) is the motion equation of the impedance control.

$$m\Delta\ddot{S}(t)+d\Delta\dot{S}(t)+k\Delta S(t)=\Delta f_S(t) \qquad (1)$$

The left side of Expression (1) is configured of a first term that is obtained by multiplying an inertia coefficient m by a second order differential value of the position S of the TCP, a second term that is obtained by multiplying a viscosity coefficient d by a differential value of the position S of the TCP, and a third term that is obtained by multiplying an elastic coefficient k by the position S of the TCP. A right side of Expression (1) is configured of a force deviation $\Delta f_S(t)$ that is obtained by subtracting a force f in reality from the target force $f_{St}$. The differential in Expression (1) means a differential in terms of time. In steps that are performed by the robot 1, a constant value is set as the target force $f_{St}$ or a value that is derived by a function depending on time as the target force $f_{St}$ may also be set.

The impedance control is control that realizes a virtual mechanical impedance by the motors M1 to M6. The inertia coefficient m means a mass that is virtually included in the TCP, the viscosity coefficient d means a viscosity resistance that is virtually received by the TCP, and the elastic coefficient k means a spring constant of an elastic force that is virtually received by the TCP. Each of coefficients m, d, and k may be set to be a different value for each direction or may be set to be a common value regardless of the direction. The resultant force correction amount ΔS means a size of the position S to which the TCP is to be moved to fix a force deviation $\Delta f_S(t)$ with the target force $f_{St}$ if the TCP receives the mechanical impedance. The control section 31 specifies a correction target position $(S_t+\Delta S)$ taking into account a component resulted from the impedance control by adding the resultant force correction amount ΔS to the target position $S_t$.

Then, the control section 31 converts the correction target position $(S_t+\Delta S)$ in a direction of each axis defining the robot coordinate system into a target driving position $D_t$ that is a driving position of the target of each of the motors M1 to M6 based on the corresponding relationship U. The control section 31 calculates a driving position deviation $D_e$ $(=D_t-D_a)$ that is obtained by subtracting the driving position $D_a$ in reality of the motors M1 to M6 from the target driving position $D_t$. Then, the control terminal 3 specifies a control amount $D_e$ obtained by adding a value that is obtained by multiplying a position control gain $K_p$ by the driving position deviation $D_e$ and a value that is obtained by multiplying a velocity control gain $K_v$ by a driving velocity deviation that is a difference with a driving velocity that is a time differential value of the driving position $D_a$ in reality. Moreover, the position control gain $K_p$ and the velocity control gain $K_v$ may include not only a proportional component but also a control gain according to a differential component and an integral component. Although not illustrated, the control amount $D_e$ is specified for each of the motors M1 to M6. The control section 31 outputs the driving signal to the motors M1 to M6 based on the control amount $D_e$ specified as described above. In a step in which both the target position $S_t$ and the target force $f_{St}$ are set by the configuration described above, the control section 31 can realize the parallel control in which the first control based on the driving position $D_a$ in reality and the second control based on the operation force f are performed in parallel. Moreover, even when there is no temporal change in the target position $S_t$, since the target force $f_{St}$ is set while setting target position to maintain same position, it can be considered as the parallel control.

In a step in which the target position $S_t$ is set and the target force $f_{St}$ is not set, the control section 31 does not calculate the resultant force correction amount ΔS based on Expression (1) of the impedance control. That is, the control section 31 regards the resultant force correction amount ΔS as 0. As a result, the control section 31 specifies the target position $S_t$ as a correction target position ($S_t$+0). In a step in which the target force $f_{St}$ is not set, since the target position $S_t$ becomes a correction target position ($S_t$+ΔS), it is possible to realize the single control in which the second control is not performed based on the operation force f while performing the first control based on the driving position $D_a$ in reality.

The changing section 32 changes the size of the servo stiffness of the arm A of the robot 1 that is realized by the control of the control section 31. Specifically, the changing section 32 reduces the size of the servo stiffness in the parallel control, in which the control section 31 performs the first control and the second control in parallel, to be smaller than that in the single control in which the second control is not performed while performing the first control. In order to change the size of the servo stiffness, the changing section 32 changes at least one of the position control gain $K_p$ and the velocity control gain $K_v$ in the control of the control section 31. In the embodiment, the changing section 32 changes both the position control gain $K_p$ and the velocity control gain $K_v$.

FIGS. 3A to 3D are graphs illustrating a change in the position control gain $K_p$. A horizontal axis in the view indicates time and a vertical axis indicates the position control gain $K_p$. In FIGS. 3A to 3D, basically, the changing section 32 sets the position control gain $K_p$ to be a normal value in a period in which the single control is performed and sets the position control gain $K_p$ to be a control value smaller than the normal value in a period in which the parallel control is performed. However, the changing section 32 gradually changes the size of the servo stiffness within a predetermined period L from a time T at which the parallel control and the single control are switched. A length of the predetermined period L may be instructed by the user.

Figure 3A:
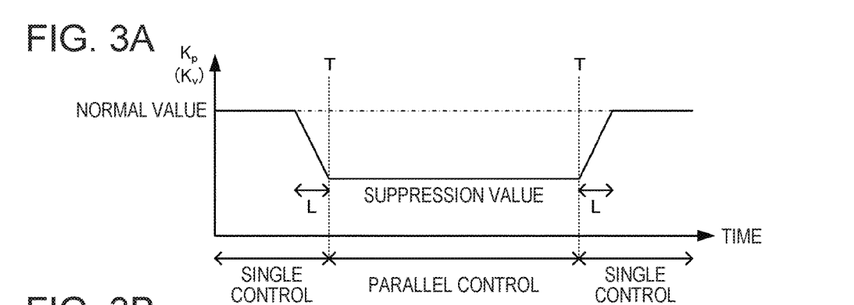
FIGS. 3A to 3D are graphs of a servo gain.
Figure 3B:
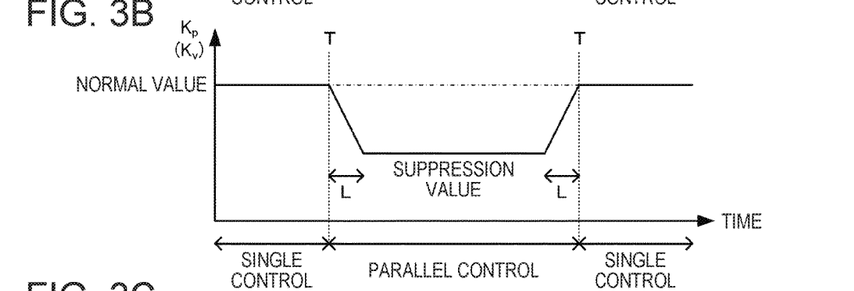

As illustrated in FIG. 3A, the changing section 32 may gradually change the size of the servo stiffness within the period in which the single control is performed and within the predetermined period L from the time T at which the parallel control and the single control are switched. In addition, as illustrated in FIG. 3B, the changing section 32 may gradually change the size of the servo stiffness in a period in which the parallel control is performed and within the predetermined period L from the time T at which the parallel control and the single control are switched. That is, the changing section 32 sets the position control gain $K_p$ of a size between the normal value and a suppression value in the predetermined period L. In the predetermined period L, it is preferable that the position control gain $K_p$ is set based on a continuous function, but may be set based on a discontinuous function. In addition, in the predetermined period L, the position control gain $K_p$ may be set based on a linear function or may be set based on a non-linear function. In the embodiment, the velocity control gain $K_v$ is also changed similar to the position control gain $K_p$.

Figure 3C:
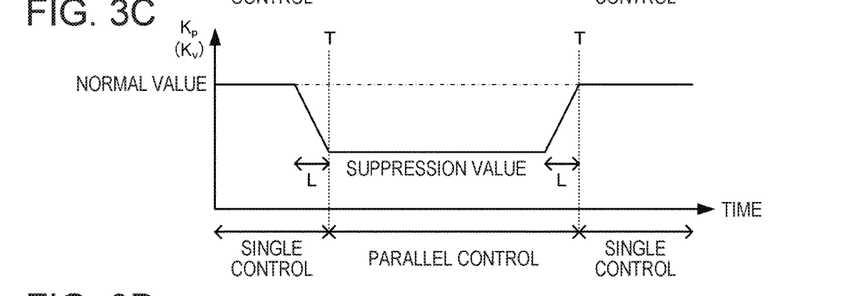
Figure 3D:
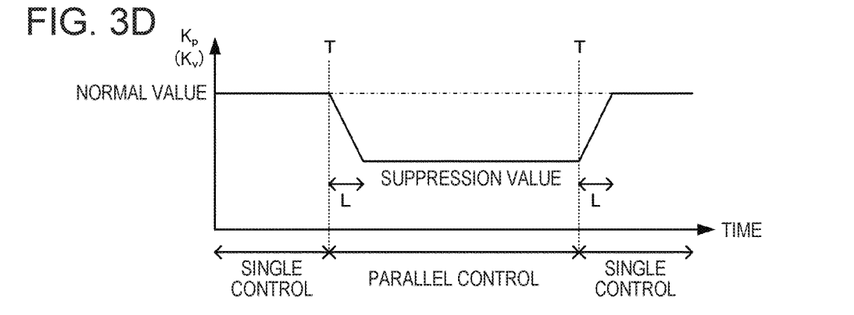

In addition, as illustrated in FIG. 3C, the size of the servo stiffness is gradually changed within the period of single control immediately before when the parallel control is started and the size of the servo stiffness may be gradually changed within the period of the parallel control when completing the parallel control. Furthermore, as illustrated in FIG. 3D, the size of the servo stiffness is gradually changed within the period of the parallel control when starting the parallel control, and the size of the servo stiffness may be gradually changed within the period of the single control immediately after completing the parallel control.

As described above, when combining the first control and the second control, it is possible to suppress that the motors M1 to M6 are hypersensitively controlled and to stabilize the control of the motors M1 to M6 by changing the size of the servo stiffness. Since the changing section 32 reduces the size of the servo stiffness in the parallel control to be smaller than that in the single control, it is possible to stabilize the control of the motors M1 to M6 by reducing the size of the servo stiffness in a state where the motors M1 to M6 can be controlled by combining a control amount resulted from the first control and a control amount resulted from the second control. Furthermore, since the changing section 32 gradually changes the size of the servo stiffness, it is possible to suppress that the control amount $D_c$ of the motors M1 to M6 is rapidly changed and to stabilize the control of the motors M1 to M6.

Furthermore, as illustrated in FIG. 3A, the changing section 32 changes the size of the servo stiffness within the predetermined period L within the period in which the single control is performed and thereby it is possible to maintain the position control gain $K_p$ in a small suppression value (constant value) in the period in which the parallel control is performed and to stabilize the control of the motors M1 to M6 in the parallel control. On the other hand, as illustrated in FIG. 3B, the changing section 32 changes the size of the servo stiffness within the predetermined period L within the period in which the parallel control is performed, thereby making it possible to maintain the position control gain $K_p$ at a large normal value (constant value) in the period in which the single control is performed, and to reliably move the TCP to the target position $S_t$.

In the embodiment, the changing section 32 switches between changing the size of the servo stiffness or not depending on instruction of the user. Specifically, the change instruction receiving section 33 displays a graphic user interface (GUI) in a display, and thus, the instruction of the user is received.

Figure 4:
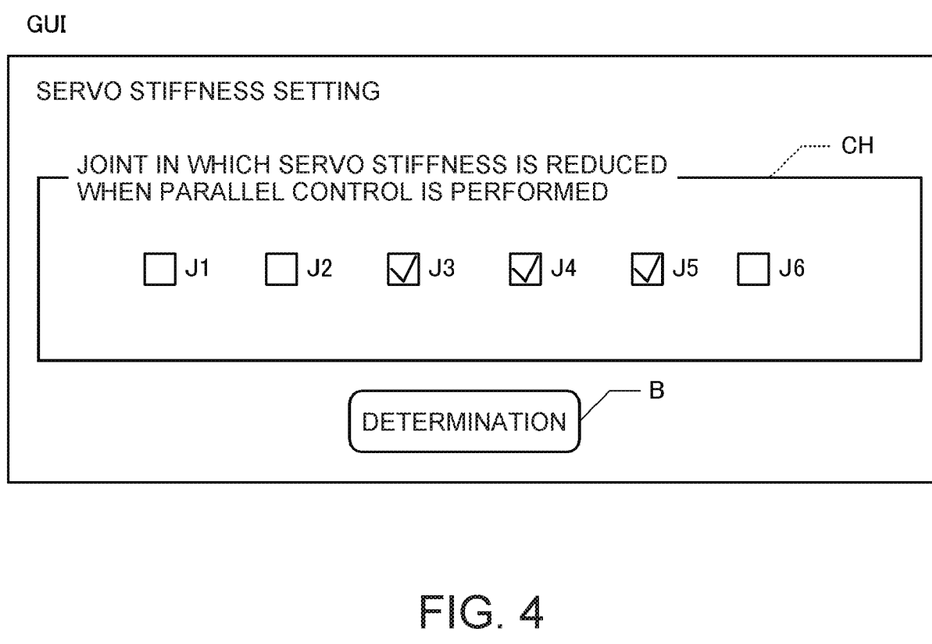
FIG. 4 is a diagram illustrating a GUI.

FIG. 4 is a diagram illustrating the GUI. In the GUI, when performing the parallel control for each of a plurality of the joints J1 to J6 (motors M1 to M6), a check box CH and a determination button B capable of instructing whether or not to reduce the servo stiffness are provided. The change instruction receiving section 33 receives the operation of the user with respect to the GUI by the input device. If the determination button B is operated, the changing section 32 changes the size of the servo stiffness of the arm A of the robot 1 for each of the plurality of the motors M1 to M6 based on an operation that is performed with respect to the check box CH. For the motors M1 to M6 of the joints J1 to J6 in which a check is put into the check box CH, the changing section 32 changes the servo stiffness as illustrated in any one of FIGS. 3A to 3D. The changing section 32 maintains the servo stiffness at the normal value for the motors M1 to M6 of the joints J1 to J6 in which the check is not put into the check box CH.

As described above, it is possible to meet requirements such as accuracy of the control has higher priority than stability of the control by switching between changing the size of the servo stiffness or not depending on the instruction of the user. Moreover, whether or not the size of the servo stiffness is changed may be instructed for each step of an operation performed by the robot 1, or may be instructed for each period within a single step. In addition, since the size of the servo stiffness of the arm A of the robot 1 is changed for each of the plurality of the motors M1 to M6, it is possible to flexibly instruct whether the stability of the control or the accuracy of the control is emphasized for each of the plurality of the joints J1 to J6. Moreover, whether or not the size of the servo stiffness is changed may be instructed for each moving direction of the TCP. For example, a change in the servo stiffness in the Z direction in the robot coordinate system is permitted and a change in the servo stiffness in the X and Y directions in the robot coordinate system may not be permitted.

(2) Other Embodiments

Here, whether the stability of the control or the accuracy of the control is emphasized may be different depending on operation contents that are performed by the robot 1. Thus, the changing section 32 may switch between changing the size of the servo stiffness or not depending on the operation contents. For example, the changing section 32 may not change the size of the servo stiffness if the robot 1 performs an operation of determining a finished shape of a processing target product. As the operation of determining the finished shape of the processing target product, a cutting operation, a press operation, a polishing operation, an engraving operation, and the like are exemplified. Since the operation contents often depend on a type of the end effector 2, the changing section 32 may switch between changing the size of the servo stiffness or not depending on the type of the end effector 2 mounted on the robot 1.

The changing section 32 may change at least one of the position control gain $K_p$ and the velocity control gain $K_v$, or may change only one of the position control gain $K_p$ and the velocity control gain $K_v$. Of course, the control section 31 may not necessarily perform the control by using both the position control gain $K_p$ and the velocity control gain $K_v$, and may perform the control only by using the velocity control gain $K_v$. In this case, the changing section 32 may change the velocity control gain $K_v$. In addition, the control section 31 may perform proportional-integral-derivative (PID) control, or the changing section 32 may also change an integral gain. Furthermore, the changing section 32 may not change the gain for each of the proportional component, the differential component, and the integral component, or may also substantially change the gain of each component uniformly by multiplying a ratio corresponding to the servo stiffness to the control amount $D_c$ that is a sum of the proportional component, the differential component, and the integral component.

The changing section 32 may not necessarily change the servo stiffness in two stages, or may also change a control value of a plurality of stages, the position control gain $K_p$, and the velocity control gain $K_v$. In addition, the second control based on the operation force f may not necessarily be the impedance control using all the elastic coefficient k, the inertia coefficient m, the viscosity coefficient d. In addition, the changing section 32 may not necessarily change the size of the servo stiffness of the arm A of the robot 1 for each of the plurality of the motors M1 to M6, or may also change the size of the servo stiffness uniformly for the plurality of the motors M1 to M6. In addition, the change instruction receiving section 33 may receive instruction whether or not the size of the servo stiffness is changed for only a part of the plurality of the motors M1 to M6 without receiving instruction whether or not the size of the servo stiffness is changed for the other part of the plurality of the motors M1 to M6.

The entire disclosure of Japanese Patent Application No. 2015-071195, filed Mar. 31, 2015 is expressly incorporated by reference herein.

What is claimed is:

1. A robot control apparatus for controlling a robot having at least one servo motor, the robot control apparatus comprising:
   a control section that acquires a driving position of a motor that drives a robot arm and an operation force that is a force operating on the robot arm, and performs a first control of the motor based on the driving position and a second control of the motor based on the operation force; and
   a changing section that reduces a servo stiffness of the motor in a control operation in which the control section performs both the first control and the second control at the same time, wherein the change in servo stiffness is realized by the control of the control section.

2. The robot control apparatus according to claim 1, wherein the changing section progressively changes the servo stiffness.

3. The robot control apparatus according to claim 1, wherein the changing section reduces the servo stiffness in a parallel control in which the control section performs the first control and the second control in parallel to be less than that in a single control in which one of the first control and the second control is performed and the other of the first control and the second control is not performed.

4. The robot control apparatus according to claim 3, wherein the single control is control in which the second control is not performed while performing the first control.

5. The robot control apparatus according to claim 3, wherein the changing section progressively changes the servo stiffness within a period in which the control section performs the parallel control and within a predetermined period from a time at which the parallel control and the single control are switched.

6. The robot control apparatus according to claim 3, wherein the changing section progressively changes the servo stiffness within a period in which the single control is performed and within a predetermined period from a time at which the parallel control and the single control are switched.

7. The robot control apparatus according to claim 1, wherein the changing section changes at least one of a position control gain and a velocity control gain in the control of the control section.

8. The robot control apparatus according to claim 1, wherein the changing section switches between changing the servo stiffness or not depending on operation contents or instruction of a user.

9. The robot control apparatus according to claim 1, wherein the motor is one of a plurality of motors, and the changing section changes the servo stiffness of the robot for each of the plurality of motors.

10. A robot system comprising:
    a driving section that drives a servo motor of a robot;
    a force detector that detects an operation force that is a force operating on the robot;
    a control section that performs first control of the driving section based on a driving position of the driving section and second control of the driving section based on the operation force; and
    a changing section that reduces a servo stiffness of the servo motor in a control operation in which the control section performs both the first control and the second control at the same time, wherein the change in servo stiffness is realized by the control of the control section.

11. A robot control method comprising:
acquiring a driving position of a motor driving a robot and an operation force that is a force operating on the robot by a control section;
performing first control of the motor based on the driving position and second control of the motor based on the operation force; and
reducing a servo stiffness of the motor during performance of both the first control and the second control at the same time.

* * * * *